(12) United States Patent
Kawai

(10) Patent No.: US 10,048,656 B2
(45) Date of Patent: Aug. 14, 2018

(54) CONTROL DEVICE, CONTROL METHOD, PROGRAM, AND RECORDING MEDIUM FOR LINE PROCESSING MACHINES

(75) Inventor: Wakahiro Kawai, Kyoto (JP)

(73) Assignee: OMRON Corporation, Kyoto (JP)

( * ) Notice: Subject to any disclaimer, the term of this patent is extended or adjusted under 35 U.S.C. 154(b) by 777 days.

(21) Appl. No.: 14/000,452

(22) PCT Filed: Mar. 17, 2011

(86) PCT No.: PCT/JP2011/056451
§ 371 (c)(1),
(2), (4) Date: Aug. 20, 2013

(87) PCT Pub. No.: WO2012/124114
PCT Pub. Date: Sep. 20, 2012

(65) Prior Publication Data
US 2013/0331959 A1 Dec. 12, 2013

(30) Foreign Application Priority Data
Mar. 14, 2011 (JP) ................. 2011-055977

(51) Int. Cl.
G05B 13/02 (2006.01)
G05B 19/418 (2006.01)

(52) U.S. Cl.
CPC ........... *G05B 13/02* (2013.01); *G05B 19/418* (2013.01); G05B 2219/32021 (2013.01); Y02P 70/161 (2015.11); Y02P 90/02 (2015.11); Y02P 90/205 (2015.11)

(58) Field of Classification Search
CPC .................. G05B 13/02; G05B 19/418; G05B 2219/32021; Y02P 90/205; Y02P 90/02; Y02P 70/161
See application file for complete search history.

(56) References Cited

U.S. PATENT DOCUMENTS

| 5,293,024 A | 3/1994 | Sugahara et al. |
| 6,060,697 A | 5/2000 | Morita et al. |
| 6,105,138 A | 8/2000 | Arakawa et al. |
| 6,188,142 B1 | 2/2001 | Loth-Krausser |

(Continued)

FOREIGN PATENT DOCUMENTS

| CN | 1230303 A | 9/1999 |
| CN | 1728523 A | 2/2006 |

(Continued)

OTHER PUBLICATIONS

International Search Report for corresponding International Application No. PCT/JP2011/056451, dated Jun. 7, 2011 (3 pages).

(Continued)

*Primary Examiner* — Nathan L Laughlin
(74) *Attorney, Agent, or Firm* — Osha Liang LLP

(57) ABSTRACT

A control device for controlling a line in which a plurality of machines performs processes in sequence on a workpiece, the control device having a monitoring section that monitors an amount of electric energy of at least a first machine of the plurality of machines, and a power source control section that controls a power source of at least a second machine of the plurality of machines in accordance with the amount of electric energy of the first machine.

12 Claims, 6 Drawing Sheets

(56) References Cited

U.S. PATENT DOCUMENTS

| | | | | |
|---|---|---|---|---|
| 6,303,395 | B1* | 10/2001 | Nulman | G05B 19/4183 438/14 |
| 6,392,318 | B1* | 5/2002 | Griffis | H01H 47/002 307/125 |
| 6,583,386 | B1 | 6/2003 | Ivkovich | |
| 7,208,697 | B2* | 4/2007 | Blankenship | B23K 9/0953 219/130.21 |
| 8,346,596 | B2 | 1/2013 | Reaume | |
| 2004/0230851 | A1 | 11/2004 | Chao et al. | |
| 2006/0023477 | A1 | 2/2006 | Lee | |
| 2006/0052898 | A1 | 3/2006 | Blumenfeld et al. | |
| 2006/0156044 | A1 | 7/2006 | Shimizu et al. | |
| 2007/0050093 | A1 | 3/2007 | Furukawa | |
| 2007/0227448 | A1 | 10/2007 | Tomine | |
| 2007/0270992 | A1 | 11/2007 | Nishida et al. | |
| 2007/0293969 | A1 | 12/2007 | Hirai et al. | |
| 2008/0077817 | A1 | 3/2008 | Brundridge et al. | |
| 2008/0172312 | A1* | 7/2008 | Synesiou | G06Q 10/00 705/34 |
| 2010/0106992 | A1 | 4/2010 | Schauer | |
| 2010/0187914 | A1 | 7/2010 | Rada et al. | |
| 2010/0191487 | A1 | 7/2010 | Rada et al. | |
| 2010/0194358 | A1 | 8/2010 | Stanford-Clark | |
| 2010/0268369 | A1* | 10/2010 | Ogata | H05K 13/08 700/110 |
| 2011/0025517 | A1 | 2/2011 | Kobayashi et al. | |
| 2011/0093125 | A1* | 4/2011 | Schoeman | H02J 3/14 700/291 |
| 2011/0112698 | A1* | 5/2011 | Edwards | G05B 17/02 700/291 |
| 2011/0115622 | A1 | 5/2011 | Sadwick | |
| 2011/0119515 | A1 | 5/2011 | Sadwick et al. | |
| 2011/0138202 | A1 | 6/2011 | Inoue et al. | |
| 2011/0144791 | A1 | 6/2011 | Loldj et al. | |
| 2011/0172792 | A1 | 7/2011 | Shinohara et al. | |
| 2011/0172838 | A1 | 7/2011 | Pai et al. | |
| 2012/0084030 | A1 | 4/2012 | Kitagawa et al. | |
| 2012/0084031 | A1 | 4/2012 | Saito et al. | |
| 2012/0290231 | A1 | 11/2012 | Sogou et al. | |
| 2013/0211844 | A1 | 8/2013 | Sadwick | |
| 2013/0331959 | A1 | 12/2013 | Kawai | |

FOREIGN PATENT DOCUMENTS

| | | |
|---|---|---|
| DE | 102005057270 A1 | 6/2007 |
| DE | 102008001777 A1 | 11/2009 |
| JP | H10-322906 A | 12/1998 |
| JP | 11-237933 A | 8/1999 |
| JP | 2000-260672 A | 9/2000 |
| JP | 2000-339024 A | 12/2000 |
| JP | 2001-320199 A | 11/2001 |
| JP | 2002-062917 A | 2/2002 |
| JP | 2003-143762 A | 5/2003 |
| JP | 2005-092827 A | 4/2005 |
| JP | 2005-293546 A | 10/2005 |
| JP | 2006-011897 A | 1/2006 |
| JP | 2006-277131 A | 10/2006 |
| JP | 2006-310750 A | 11/2006 |
| JP | 2008-306835 A | 12/2008 |
| JP | 2010-146454 A | 7/2010 |
| JP | 2010/250381 A | 11/2010 |
| JP | 2011-036003 A | 2/2011 |
| JP | 2011-090542 A | 5/2011 |
| JP | 4775516 B1 | 9/2011 |
| KR | 2003-0057236 A | 7/2003 |
| KR | 2011-0128830 A | 11/2011 |
| TW | 332875 | 6/1998 |
| TW | 200424834 A | 11/2004 |
| TW | 200821816 A | 5/2008 |
| TW | 311008 B | 6/2009 |
| TW | 201103223 A | 1/2011 |
| TW | 201108547 A | 3/2011 |
| WO | 2010/116989 A1 | 10/2010 |

OTHER PUBLICATIONS

Written Opinion for corresponding International Application No. PCT/JP2011/056451, dated Jun. 7, 2011 (3 pages).
First Notice of the Opinion on Examination issued in corresponding Chinese Application No. 201180068020.7, dated Jan. 21, 2015 (23 pages).
Extended European Search Report issued in corresponding European Application No. 11860848.8, dated Nov. 6, 2013 (8 pages).
A. Cannata et al; "Energy efficiency driven process analysis and optimization in discrete manufacturing"; IEEE, pp. 4449-4454; Nov. 3, 2009 (6 pages).
S. Karnouskos et al; "Towards the Energy Efficient Future Factory"; IEEE, pp. 367-371; Jun. 23, 2009 (5 pages).
K. Bunse et al; "Integrating energy efficiency performance in production management—gap analysis between industrial needs and scientific literature"; Journal of Cleaner Production, pp. 667-679; Nov. 17, 2010 (13 pages).
Office Action issued in Taiwanese Application No. 101105935, dated Apr. 8, 2014 (11 pages).
Office Action issued in Taiwanese Application No. 101105932, dated Apr. 14, 2014 (12 pages).
English translation of Written Opinion for corresponding International Application No. PCT/JP2011/056451, dated Jun. 7, 2011 (4 pages).
Written Opinion for corresponding International Application No. PCT/JP2012/052931, dated May 1, 2012 (7 pages).
International Search Report for corresponding International Application No. PCT/JP2012/052931, dated May 1, 2012 (3 pages).
Japanese Office Action for Application No. 2011-143498, dated Jun. 24, 2014 (4 pages).
Notice of Allowance issued in corresponding Korean Application No. 10-2014-7013348, dated Feb. 29, 2016 (2 pages)
International Search Report issued in PCT/JP2012/071950, dated Nov. 27, 2012 (2 pages).
Written Opinion of the International Searcing Authority issued in PCT/JP2012/071950, dated Nov. 27, 2012 (4 pages).
International Preliminary Report on Patentability issued in PCT/JP2012/071950, dated Jun. 26, 214 (8 pages).
Extended European Search report issued in European Application No. 12856991.0, dated Mar. 26, 2015 (8 pages).
Office Action issued in corresponding Chinese Application No. 201280057041.3, dated Sep. 2, 2015 (17 pages).
Office Action issued in corresponding Korean Application No. 2014-7013348, dated Nov. 17, 2015 (8 pages).
Office Action issued in corresponding European Application No. 12856991.0, dated Oct. 12, 2016 (6 pages).
Office Action issued in corresponding U.S. Appl. No. 14/360,242, dated Nov. 11, 2016 (38 pages).

* cited by examiner

US 10,048,656 B2

CONTROL DEVICE, CONTROL METHOD, PROGRAM, AND RECORDING MEDIUM FOR LINE PROCESSING MACHINES

BACKGROUND

Technical Field

The present invention relates to a line in which a plurality of machines performs processes in sequence on a workpiece.

Related Art

A plurality of machines (automation devices) is provided in a line which is located in a factory or a workshop, and the plurality of machines performs processes such as fabricating, assembly, and inspection on a workpiece being carried.

Assume here that there is a production line in which a machine a performs a process and a machine b which is located downstream from the machine a in a direction in which a workpiece is carried performs a process immediately after the machine a performs the process. In this production line, the workpiece is carried into the machine a, carried from the machine a to the machine b, and carried out from the machine b automatically by a conveyor. Conventionally, such a production line has employed the following control method. According to the control method, when the production line starts operating, a power source of the machine a and a power source of the machine b are turned on substantially simultaneously so as to cause both the machines a and b to be in a standby state. Then, a start timing at which each of the machines a and b starts performing the process is detected in accordance with an output of a sensor (e.g., a photoelectric sensor or a limit switch) which detects the workpiece being carried. Subsequently, at the start timing thus detected, a state of each of the machines a and b shifts from the standby state to a process performing state (a state in which more electric power is consumed than in the standby state and a process is performed). According to this control method, the machines a and b, whose power sources are always turned on in a period in which the line is in operation, consume, during the standby state, electric power which does not directly contribute to a process such as fabricating or assembly.

Assume also that there is a production line in which, after a machine c performs a process, a machine d which is located downstream from the machine c in a direction in which a workpiece is carried performs a process, and the workpiece is carried from the machine c to the machine d by manpower. In such a production line, it is unnecessary to turn on a power source of the machine c and a power source of the machine d simultaneously. However, in a case where the machine d which is located downstream from the machine c is a heat treatment machine (e.g., a molding machine, a reflow furnace, or a drier), in order to reduce a loss in time for increasing a temperature of the machine d, the machine d may perform idle running (running to maintain an inside of the machine at a standby temperature that is higher than a room temperature) from a start of operation of the line.

CITATION LIST

Patent Literatures

Patent Literature 1
Japanese Patent Application Publication, Tokukai, No. 2000-260672 (Publication Date: Sep. 22, 2000)

Patent Literature 2
Japanese Patent Application Publication, Tokukai, No. 2005-293546 (Publication Date: Oct. 20, 2005)

Patent Literature 3
Japanese Patent Application Publication, Tokukai, No. 2006-011897 (Publication Date: Jan. 12, 2006)

SUMMARY

However, a recent growing recognition of a reduction in carbon dioxide is demanding reduced electric power consumption in a factory. Thus, reduction of wasteful electric power consumption may be advantageous. Note that an example of wasteful electric power consumption is exemplified by a case where a period of the standby state or a period of the idle running is secured than necessary.

One or more embodiments of the present invention provides a control device and a control method each of which is capable of preventing wasteful electric power consumption in a line including a plurality of machines.

According to one or more embodiments of the present invention, a control device for controlling a line in which a plurality of machines performs processes in sequence on a workpiece, the control device includes: a monitoring section for monitoring an amount of electric energy of at least a first machine of the plurality of machines; and a power source control section for controlling a power source of at least a second machine of the plurality of machines in accordance with the amount of electric energy of the first machine.

Further, according to one or more embodiments of the present invention, a control method for controlling a line in which a plurality of machines performs processes in sequence on a workpiece, the control method includes the steps of: (i) monitoring an amount of electric energy of at least a first machine of the plurality of machines; and (ii) controlling a power source of at least a second machine of the plurality of machines in accordance with the amount of electric energy of the first machine.

The configuration makes it possible to control the power source of the second machine in accordance with a process performed by the first machine (a process performed on the workpiece) or how idle running of the first machine is progressing. Therefore, for example, it is possible to minimize, as much as possible, a period of a standby state of the second machine or a period of the idle running of the first machine. This yields an effect of preventing wasteful electric power consumption.

As described above, according to a control device of one or more embodiments of the present invention, it is possible to minimize, as much as possible, a period of the standby state or a period of the idle running. This yields an effect of preventing wasteful electric power consumption.

DETAILED DESCRIPTION

Figure 1:
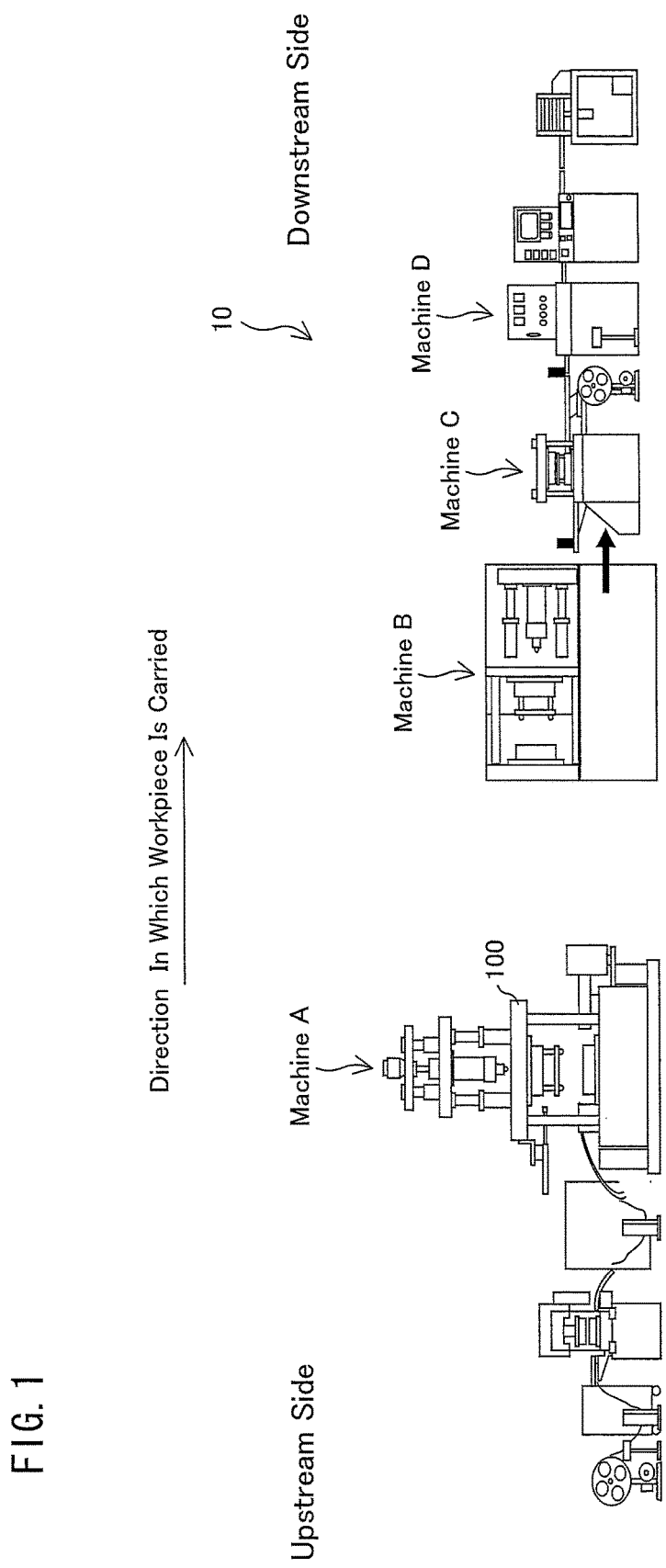
FIG. 1 is a schematic view showing a production line.

Embodiments of the present invention are specifically described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 is a schematic view showing an overall configuration of a production line in accordance with one or more embodiments of the present invention.

A production line 10 (line) of Embodiment 1 includes machines A to D, and the machines A to D perform processes in sequence on a workpiece being carried. Note that the workpiece means an object to be processed in the line and the workpiece in the production line 10 of Embodiment 1 is a component for use in an electronic circuit.

In the production line 10, the machine A of the machines A, B, C, and D is located on the most upstream side of a direction in which the workpiece is carried (see FIG. 1). The machine B is located downstream from the machine A in the direction in which the workpiece is carried. The machine C is located downstream from the machine B in the direction in which the workpiece is carried. The machine D is located downstream from the machine C in the direction in which the workpiece is carried.

Namely, the machines A, B, C, and D perform the processes on the workpiece in the production line 10 as below. First, the workpiece is carried into the machine A, and the machine A performs the process on the workpiece. The workpiece on which the process has been performed by the machine A is carried into the machine B, and the machine B performs the process on the workpiece. The workpiece on which the process has been performed by the machine B is carried into the machine C, and the machine C performs the process on the workpiece. The workpiece on which the process has been performed by the machine C is carried into the machine D, and the machine D performs the process on the workpiece.

The machine A, which is a machine for pressing the workpiece, includes a metal-fabricating press 100 and a peripheral device such as a roll feeder for supplying a member to the metal-fabricating press 100. The machine B is an injection molding machine for performing insert molding on not only the workpiece pressed by the machine A (e.g., a metal terminal) but also a resin member. The machine C is a metal bending press for bending the workpiece on which the process has been performed by the machine B. The machine D is an application and drying device for applying an adhesive to the workpiece on which the process has been performed by the machine C, and drying the workpiece.

In the production line 10, the workpiece is carried into the machine A is by manpower (a worker). Furthermore, the workpiece is carried from the machine A to the machine B, carried into the machine B, and carried out from the machine B also by manpower.

In contrast, the workpiece is carried into the machine C, carried from the machine C to the machine D, and carried out from the machine D by a conveyor. That is, when the worker places, on the conveyor, the workpiece which has been carried out from the machine B, the workpiece is automatically carried into the machine C by the conveyor. Thereafter, a process in which the workpiece is carried is automatically performed by the conveyor until the workpiece is carried out from the machine D.

Figure 2:
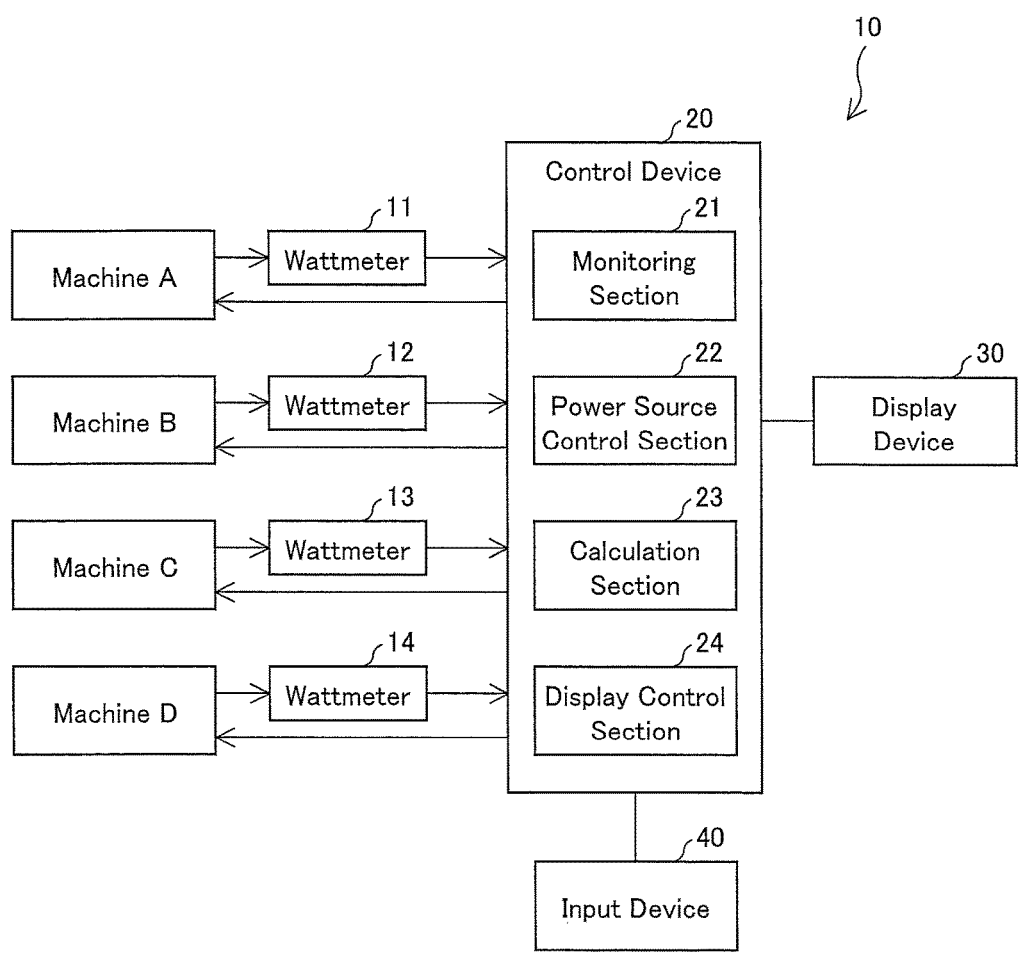
FIG. 2 is block diagram showing an overall configuration of a control device which controls each of a plurality of machines shown in FIG. 1.

The production line 10 described above includes a control device which controls power sources of the machines A to D. The control device is described below with reference to FIG. 2. FIG. 2 is a block diagram showing an overall configuration of a control device 20.

The control device 20 is an information processor for controlling the power sources of the machines A to D of the production line 10. The control device 20 is connected not only to each of the power sources of the machines A to D but also to a display device 30 and an input device 40. The control device 20 is also connected to each of wattmeters 11 to 14 provided in the production line 10.

The control device 20 is constituted by, for example, a PC (Personal Computer)-based computer. The control device 20 performs a control process by causing a computer to execute a program. The program is recorded in a removable medium such as a CD-ROM (Compact Disc Read Only Memory), and the control device 20 may read the program from the removable medium (a computer-readable recording medium) and use the program. Alternatively, the control device 20 may read a program which is installed in, for example, a hard disk (a computer-readable recording medium). Note that the control process which is performed by the control device 20 is specifically described later.

The display device 30 is display means such as an LCD (Liquid Crystal Display), a PDP (Plasma Display), an organic EL (electroluminescence) display, or the like. The display device 30 outputs, by display, various kinds of information such as a letter and an image in accordance with display data received from the control device 20.

The input device 40, which receives various inputs from the worker in the production line 10, is constituted by an input button, a keyboard, and a pointing device such as a mouse, and other input devices. The input device 40 converts, to input data, information inputted from the operator, and transmits the input data to the control device 20.

The wattmeters 11 to 14 are integrating wattmeters measuring (outputting) total amounts of electric energy of the machines. Specifically, the wattmeter 11 measures the total amount of electric energy of the machine A. The wattmeter 12 measures the total amount of electric energy of the machine B. The wattmeter 13 measures the total amount of electric energy of the machine C. The wattmeter 14 measures the total amount of electric energy of the machine D. Note that a total amount of electric energy refers to a total amount of electric energy obtained between a point in time at which a machine is located and a point in time at which the machine is subjected to the measurement (an integrated value of electric power that is consumed).

Next, the control process which is performed by the control device 20 is specifically described. The control device 20 includes a monitoring section 21, a power source control section 22, a calculation section 23, and a display control section 24 (see FIG. 2). Note that, the calculation section 23 and the display control section 24 are not used in Embodiment 1 but are used in Embodiment 3, a description thereof is omitted here, and is described below with reference to Embodiment 3.

The monitoring section 21 is a block for monitoring first amounts of electric energy of the machines A to D by accessing the wattmeters 11 to 14. Note that a first amount of electric energy is an integrated value of electric power used by a machine between a point in time at which a power source of the machine was turned on and a current point in time. That is, the first amount of electric energy of the machine A is an integrated value of electric power used by the machine A between a point in time at which the power source of the machine A was turned on and the current point in time. The first amount of electric energy of the machine B is an integrated value of electric power used by the machine B between a point in time at which the power source of the machine B was turned on and the current point in time. The first amount of electric energy of the machine C is an integrated value of electric power used by the machine C between a point in time at which the power source of the machine C was turned on and the current point in time. The first amount of electric energy of the machine D is an integrated value of electric power used by the machine D between a point in time at which the power source of the machine D was turned on and the current point in time.

Note that the monitoring section 21 calculates an absolute value of a difference between a measured value of the wattmeter 11 at the point in time at which the power source of the machine A was turned on (a total amount of electric energy) and a measured value of the wattmeter 11 at the current point in time, and the monitoring section 21 monitors the absolute value as the first amount of electric energy of the machine A. The machines B to D are similar to the machine A in method for monitoring the first amount of electric energy (however, cases of the machines B, C, and D are different from that of the machine A in the following points. In the case of the machine B, the monitoring section 21 calculates the difference by use of a measured value of the wattmeter 12 at the current point in time and a measured value of the wattmeter 12 at the point in time at which the power source of the machine B was turned on. In the case of the machine C, the monitoring section 21 calculates the difference by use of a measured value of the wattmeter 13 at the current point in time and a measured value of the wattmeter 13 at the point in time at which the power source of the machine C was turned on. In the case of the machine D, the monitoring section 21 calculates the difference by use of a measured value of the wattmeter 14 at the current point in time and a measured value of the wattmeter 14 at the point in time at which the power source of the machine D was turned on).

The power source control section 22 is a block for controlling the power sources of the machines A to D to be switched from off to on in accordance with the first amount of electric energy which amount is monitored by the monitoring section 21 or in accordance with a user's command. A process performed by the power source control section 22 is described below.

First, assume that the production line 10 is in a nonoperational state and the power sources of the machines A to D are turned off. In this state, in a case where a user inputs, via the input device 40 to the control device 20, a start command to start operation of the production line 10, the start command is transmitted to the power source control section 22.

When the power source control section 22 receives the start command, the power source control section 22 switches, from off to on, the power source of the machine A which performs the process first among the machines A to D on the workpiece (turns on the power source of the machine A which, among the machines A to D, is located on the most upstream side of the direction in which the workpiece is carried). Specifically, when the power source control section 22 receives the start command from the user, the power source control section 22 transmits, to the machine A, a control signal for switching the power source from off to on. This switches the power source of the machine A from off to on.

After the power source of the machine A is switched from off to on, the power source control section 22 continues to determine whether or not the first amount of electric energy of the machine A which amount is monitored by the monitoring section 21 increases from a value being lower than a threshold value A to a value being not less than the threshold value A. When the power source control section 22 detects that the first amount of electric energy of the machine A increases from the value being lower than the threshold value A to the value being not less than the threshold value A, the power source control section 22 switches, from off to on, the power source of the machine B which performs the process that is later than the process performed by the machine A (turns on the power source of the machine B which is located downstream from the machine A in the direction in which the workpiece is carried). Specifically, when the power source control section 22 detects that the first amount of electric energy of the machine A increases from the value being lower than the threshold value A to the value being not less than the threshold value A, the power source control section 22 transmits, to the machine B, a control signal for switching the power source from off to on. This switches the power source of the machine B from off to on. Note that the threshold value A is a value from which it is assumed that the process performed by the machine A progresses to a state in which the power source of the machine B can be turned on. The threshold value A is a value empirically set in accordance with, for example, specs of each of the machines, contents of design of the line 10, and a kind of a workpiece. Note also that the threshold value A may be set by performing a test operation.

After the power source of the machine B is switched from off to on, the power source control section 22 continues to determine whether or not the first amount of electric energy of the machine B which amount is monitored by the monitoring section 21 increases from a value being lower than a threshold value B to a value being not less than the threshold value B. When the power source control section 22 detects that the first amount of electric energy of the machine B increases from the value being lower than the threshold value B to the value being not less than the threshold value B, the power source control section 22 switches, from off to on, the power sources of the machines C and D which perform the process that is later than the process performed by the machine B (turns on the power sources of the machines C and D located downstream from the machine B in the direction in which the workpiece is carried). Specifically, when the power source control section 22 detects that the first amount of electric energy of the machine B increases from the value being lower than the threshold value B to the value being not less than the threshold value B, the power source control section 22 transmits, to the machines C and D, control signals for switching the power sources from off to on. This switches the power sources of the machines C and D from off to on. Note that the threshold value B is a value from which it is assumed that the process performed by the machine B progresses to a state in which the power sources of the machines C and D can be turned on. The threshold value B is a value empirically set in accordance with, for example, specs of each of the machines, contents of design of the line 10, and a kind of a workpiece. Note also that the threshold value B may be set by performing a test operation.

The power sources of the machines A to D of the production line 10 are thus switched from off to on.

Figure 3:
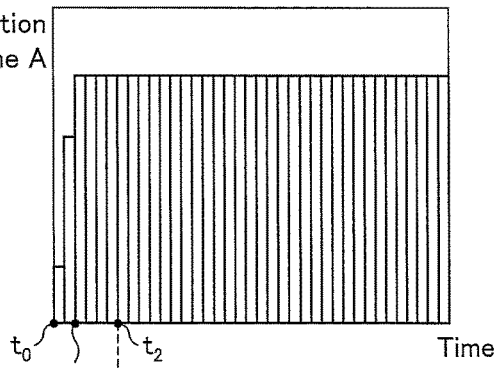
FIG. 3 is a graph showing electric power used (electric power consumption) by each of machines A to D of Embodiment 1.
Figure 3:
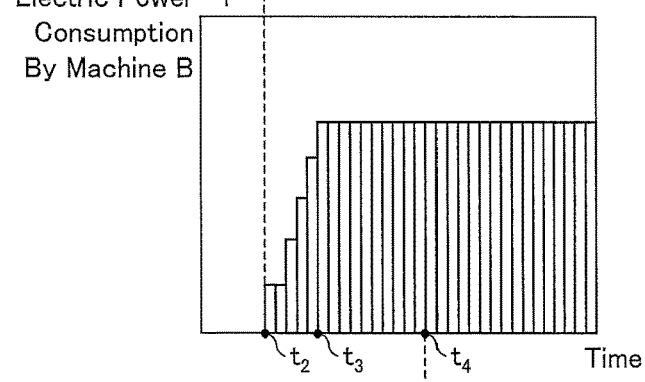
Figure 3:
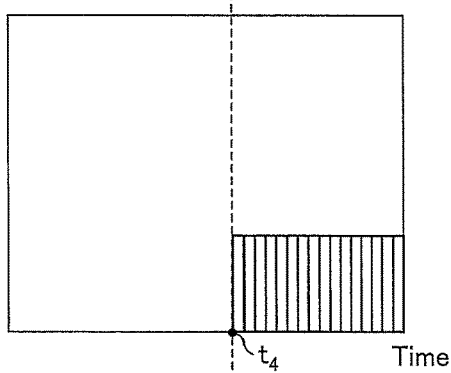
Figure 3:
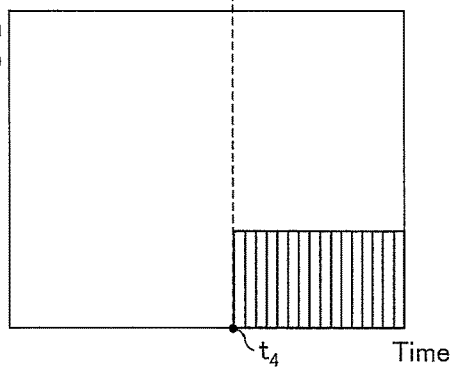

Next, timings at which the power sources of the machines A to D are switched from off to on are described with reference to FIG. 3. FIG. 3 is a graph showing electric power used (electric power consumption) by each of the machines A to D of Embodiment 1. In each of graphs shown in FIG. 3, a horizontal axis shows time, and a vertical axis shows electric power consumption by each of the machines (an instantaneous value).

It is assumed that at a point in time $t_0$ shown in FIG. 3, in response to the user's input of the start command to start operation, the power source of the machine A is switched from off to on. In this case, the power source control section 22 continues to determine whether or not the first amount of electric energy of the machine A is a value being not less than the threshold value A. For example, in a case where the current point in time is $t_1$ shown in FIG. 3, the power source control section 22 determines whether or not an integrated value of electric power consumption by the machine A during a period between points in time $t_0$ and $t_1$ (the first amount of electric energy) is the value being not less than the threshold value A. Note that an integrated value for the period between the points in time $t_0$ and $t_1$ in the graph of the machine A (see FIG. 3) corresponds to the integrated (accumulated) value of electric power consumption by the machine A during the period between the points in time $t_0$ and $t_1$.

According to the example of FIG. 3, the integrated value of electric power consumption by the machine A during the period between the point in time $t_0$ and the point in time $t_1$ (the first amount of electric energy) is less than the threshold value A. Therefore, the power source control section 22 maintains the power source of the machine B to be off at the point in time $t_1$. According to FIG. 3, when the current point in time reaches $t_2$, the integrated value of electric power consumption by the machine A during a period between points in time $t_0$ and $t_2$ is not less than the threshold value A. Accordingly, when the current point in time reaches $t_2$, the power source control section 22 determines that the first amount of electric energy of the machine A is the value being not less than the threshold value A, and turns on the power source of the machine B. This causes the machine B to be started at the point in time $t_2$, at which the power source of the machine B is turned on.

After the power source of the machine B is turned on at the point in time $t_2$, the power source control section 22 continues to determine whether or not the first amount of electric energy of the machine B is a value being not less than a threshold value. For example, in a case where the current point in time is $t_3$, the power source control section 22 determines whether or not an integrated value of electric power consumption by the machine B during a period between points in time $t_2$ and $t_3$ (the first amount of electric energy) is a value being not less than a threshold value B. According to the example of FIG. 3, the integrated value of electric power consumption by the machine B during the period between the point in time $t_2$ and the point in time $t_3$ (the first amount of electric energy) is less than the threshold value B. Therefore, the power source control section 22 maintains the power sources of the machines C and D to be off at the point in time $t_3$. According to FIG. 3, when the current point in time reaches $t_4$, the integrated value of electric power consumption by the machine B during a period between points in time $t_2$ and $t_4$ (the first amount of electric energy) is the value being not less than the threshold value B. Accordingly, when the current point in time reaches $t_4$, the power source control section determines that the integrated value of electric power consumption by the machine B during the period between the points in time $t_2$ and $t_4$ (the first amount of electric energy) is the value being not less than the threshold value B, and turns on the power sources of the machines C and D.

As described above, the control device 20 of Embodiment 1 monitors the first amount of electric energy of the machine A (first machine), and controls the power source of the machine B (second machine) in accordance with the first amount of electric energy of the machine A. Further, the control device 20 monitors the first amount of electric energy of the machine B (first machine), and controls the power sources of the machines C and D (second machines) in accordance with the first amount of electric energy of the machine B.

In particular, the control device 20 switches the power source of the machine B (second machine) from off to on when the first amount of electric energy of the machine A (first machine) increases from a value being lower than the threshold value A (first threshold value) to a value being not less than the threshold value A. Further, the control device 20 switches the power sources of the machines C and D (second machines) from off to on when the first amount of electric energy of the machine B (first machine) increases from a value being lower than the threshold value B (first threshold value) to a value being not less than the threshold value B. That is, according to Embodiment 1, in accordance with a first amount of electric energy (integrated value of used electric power) of a machine located on the upstream side, a timing is set at which a power source of a machine located on the downstream side is turned on. Note here that the first amount of electric energy of the machine located on the upstream side shows how a process is progressing in the machine located on the upstream side. Given this, according to Embodiment 1, in accordance with how the process is progressing in the machine located on the upstream side, a timing is set at which the power source of the machine located on the downstream side is switched to on.

An optimal timing at which the power source of the machine located on the downstream side is turned on (a timing which allows a period of a standby state or a period of idle running to be as short as possible) is determined in accordance with how the process is progressing in the machine located on the upstream side. Therefore, according to Embodiment 1 in which in accordance with how the process is progressing in the machine located on the upstream side, the timing is set at which the power source of the machine located on the downstream side is switched to on, it is possible to minimize the period of the standby state or the period of the idle running of the machine located on the downstream side, so that wasteful electric power consumption can be prevented.

According to Embodiment 1, the power source of the machine B is turned on when the first amount of electric energy of the machine A is not less than the threshold value A, and the power sources of the machines C and D are turned on when the first amount of electric energy of the machine B is not less than the threshold value B. However, when the first amount of electric energy of the machine A is not less than the threshold value A, not only the power source of the machine B but also the power sources of the machines C and D may be turned on.

Further, for example, the monitoring section 21 may calculate the first amount of electric energy of each of the machines as below. Note that the following description takes, as an example, the calculation of the first amount of electric energy of the machine A and same applies to the machines B to D.

First, a period during which the first amount of electric energy of the machine A is to be calculated (to be measured) is set as a target period. Namely, the target period refers to a period between the point in time at which the power source of the machine A was turned on and the current point in time. The monitoring section 21 divides the target period into a plurality of predetermined periods equal to each other, and obtains a period-integrated value of each of the predetermined periods by integrating, during the each of the predetermined periods, electric power consumed by the first machine (that is, a predetermined period is always shorter than the target period). Further, the monitoring section 21 integrates only period-integrated values of the predetermined periods in the target period each of which period-integrated values is not less than a predetermined value. Then, the monitoring section 21 regards, as the first amount of electric energy, a result obtained by the integration. Such a method for calculating the first amount of electric energy can be set so as not to integrate minute electric power consumption (e.g., electric power consumption by an electric motor in a no-load state when no process is performed) which is not related to the process performed in the machine A (e.g., fabricating). Therefore, in a case where, though the power source of the machine A was turned on, a state continues in which the machine A, to which no workpiece has been supplied for some reason, is performing no process, it is possible to prevent occurrence of a trouble such that the first amount of electric energy of the machine A is not less than the threshold value before a timing at which the power source of the machine B can be turned on.

Note that the above description has discussed a configuration in which the integrated value of electric power used between the point in time at which the power source of the machine was turned on and the current point in time is assumed as the first amount of electric energy. However, the present invention is not limited to such a configuration. For example, one or more embodiments of the present invention may be configured as below. Assuming that an integrated value of electric power used between the current point in time and a point in time being earlier than the current point in time by a given first period of time (e.g., 10 seconds) is the first amount of electric energy, the power source of the machine B is turned on when the first amount of electric energy of the machine A is not less than the threshold value, and the power sources of the machines C and D are turned on when the first amount of electric energy of the machine B is not less than the threshold value. In this case, the target period (described earlier) is a period between the current point in time and the point in time being earlier than the current point in time by the given first period of time.

Alternatively, assuming that an integrated value of electric power used between a point in time being earlier than the current point in time by a given second period of time (e.g., 15 seconds) and a point in time being earlier than the current point in time by a given third period of time that is shorter than the second period of time (e.g., 5 seconds) is the first amount of electric energy, the power source of the machine B is turned on when the first amount of electric energy of the machine A is not less than the threshold value, and the power sources of the machines C and D are turned on when the first amount of electric energy of the machine B is not less than the threshold value. In this case, the target period (described earlier) is a period between the point in time being earlier than the current point in time by the given second period of time and the point in time being earlier than the current point in time by the given third period of time that is shorter than the second period of time.

Modified Example

According to one or more embodiments of the present invention described above, in accordance with a first amount of electric energy of a machine (e.g., the machine A), a power source of a machine located downstream from that machine (e.g., the machine B) in a direction in which a workpiece is carried is switched from off to on. However, the present invention is not limited to this. Namely, one or more embodiments of the present invention may also be configured such that in accordance with a first amount of electric energy of a machine (e.g., the machine B), a power source of a machine located upstream from that machine (e.g., the machine A) in a direction in which a workpiece is carried is switched from off to on. This configuration is described below.

For example, the following modified example is assumed. According to the modified example, the machine B shown in FIG. 1 is a device which cannot perform a process on a workpiece unless an internal temperature is increased to a standby temperature in advance. Further, according to the modified example, if the machine A and the machine B start operating simultaneously, the internal temperature of the machine B does not reach the standby temperature at a timing at which a workpiece to be processed first is outputted from the machine A. Therefore, according to the modified example, the machine B needs to idle (run for maintaining the internal temperature at the standby temperature in advance before the workpiece is processed) before the start of operation of the machine A. According to such a modified example, in order to prevent wasteful electric power consumption, a period of unnecessary idle running needs to be eliminated by securing only a required period of idle running of the machine B.

Note here that in order to eliminate the period of unnecessary idle running of the machine B, the workpiece to be processed first needs to be outputted from the machine A at an appropriate timing in accordance with how idle running of the machine B is progressing. To this end, operation of the machine A needs to be started at an appropriate timing in accordance with how the idle running of the machine B is progressing. That is, an appropriate timing at which operation of the machine A is started is determined in accordance with how the idle running of the machine B is progressing. Note that the first amount of electric energy of the machine B (an integrated value of electric power consumption by the machine B between the point in time at which the power source of the machine B was turned on and the current point in time) can be referred to as a value which indicates how the idle running of the machine B is progressing.

Therefore, according to the present modified example, when the power source control section 22 receives a start command from an operator while the production line 10 is in a nonoperational state (a state in which the power sources of the machines A to D are turned off), the power source control section 22 switches only the power source of the machine B from off to on first so as to cause the machine B to perform idle running.

Thereafter, the power source control section 22 continues to determine whether or not the first amount of electric energy of the machine B (the integrated value of electric power consumption by the machine B between the point in time at which the power source of the machine B was turned on and the current point in time) increases from a value being lower than a threshold value X to a value being not less than a threshold value X. When the power source control section 22 determines that the first amount of electric energy of the machine B does not increase to the value being not less than the threshold value X, the power source control section 22 maintains the power source of the machine A to be off. In contrast, when the power source control section 22 determines that the first amount of electric energy of the machine B increases to the value being not less than the threshold value X, the power source control section 22 switches the power source of the machine A from off to on.

After the power source control section 22 turns on the power source of the machine A, the power source control section 22 continues to determine whether or not the first amount of electric energy of the machine B increases from a value being lower than a threshold value Y to the value being not less than the threshold value Y. Note that the threshold value Y is a value being higher than the threshold value X. When the power source control section 22 determines that the first amount of electric energy of the machine B does not increase to a value being not less than the threshold value Y, the power source control section 22 continues to maintain the power sources of the machines C and D to be off. In contrast, when the power source control section 22 determines that the first amount of electric energy of the machine B increases to the value being not less than the threshold value Y, the power source control section 22 switches the power sources of the machines C and D from off to on.

Figure 6:
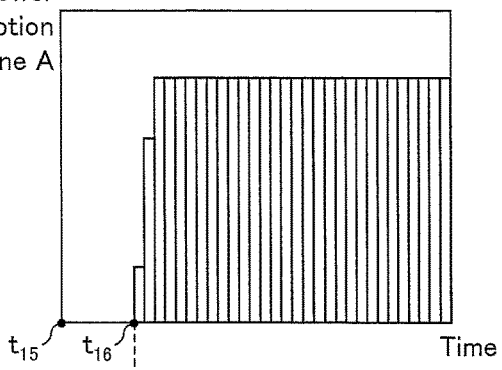
FIG. 6 is a graph showing electric power used (electric power consumption) by each of machines A to D of a modified example of Embodiment 1.
Figure 6:
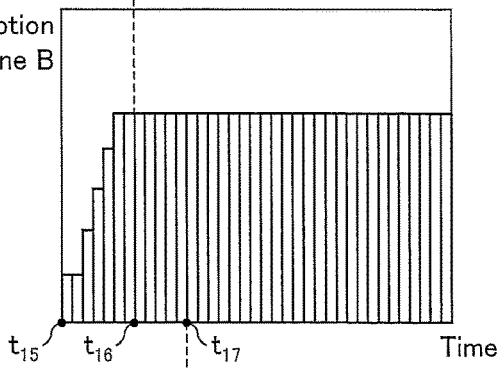
Figure 6:
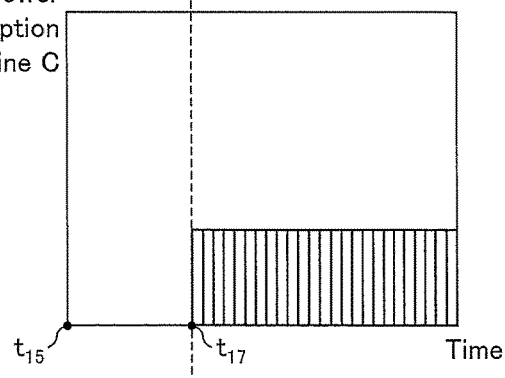
Figure 6:
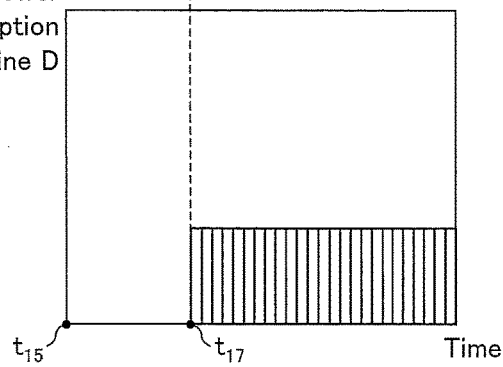

Next, timings at which the power sources of the machines A to D are switched from off to on in the present modified example are described with reference to FIG. 6. FIG. 6 is a graph showing electric power used (electric power consumption) by each of the machines A to D of the present modified example. In each of graphs shown in FIG. 6, a horizontal axis shows time, and a vertical axis shows electric power consumption by each of the machines (an instantaneous value).

At a point in time $t_{15}$ (see FIG. 6), which is the current point in time, when the power source control section 22 receives, from the user, the start command to start operation, the power source control section 22 switches the power source of the machine B from off to on. Thereafter, when the current point in time reaches $t_{16}$, the power source control section 22 determines that an integrated value of electric power consumption by the machine B during a period between points in time $t_{15}$ and $t_{16}$ (the first amount of electric energy) is not less than the threshold value X, and the power source control section 22 turns on the power source of the machine A. Further, when the current point in time shifts from $t_{16}$ to $t_{17}$, the power source control section 22 determines that an integrated value of electric power consumption of the machine B during a period between points in time $t_{15}$ and $t_{17}$ (the first amount of electric energy) is not less than the threshold value Y, and the power source control section 22 turns on the power sources of the machines C and D.

According to the modified example described earlier, the power source of the machine A (second machine) located upstream from the machine B in the direction in which a workpiece is carried can be switched from off to on in accordance with the first amount of electric energy of the machine B (first machine). This makes it possible to eliminate a period of unnecessary idle running by securing only a required period of idle running of the machine B. Therefore, it is possible to yield an effect of preventing wasteful electric power consumption.

Note that the threshold value X (first threshold value) is a value from which it is assumed that the idle running of the machine B progresses to a state in which the power source of the machine A can be turned on. The threshold value Y (first threshold value) is a value from which it is assumed that the idle running or the process performed by the machine B progresses to a state in which the power sources of the machines C and D can be turned on. Each of the threshold values can be empirically set in accordance with, for example, specs of each of the machines, contents of design of the line 10, and a kind of a workpiece. Note also that the threshold values X and Y may be set by performing a test operation.

Embodiment 1 has discussed a case where a power source is controlled to be switched from off to on, whereas Embodiment 2 will discuss a case where a power source is controlled to be switched from on to off. According to Embodiment 2, in a case where a trouble occurs in any of the machines A to D and that machine does not operate normally, power sources of the other machines are turned from on to off.

Embodiment 2 described below differs from Embodiment 1 merely in what process is performed by the monitoring section 21 and the power source control section 22, and Embodiment 2 is similar to Embodiment 1 in the other points. Therefore, the following description mainly discusses what process is performed by the monitoring section 21 and the power source control section 22, and a description of contents identical to those of Embodiment 1 is omitted here.

The monitoring section 21 is a block for monitoring second amounts of electric energy of the machines A to D by accessing the wattmeters 11 to 14. Note that a second amount of electric energy is an integrated value of electric power used between a current point in time and a point in time being earlier than the current point in time by a given period of time (e.g., 15 seconds). That is, the second amount of electric energy of the machine A is an integrated value of electric power used by the machine A between the current point in time and the point in time being earlier than the current point in time by the given period of time. The second amount of electric energy of the machine B is an integrated value of electric power used by the machine B between the current point in time and the point in time being earlier than the current point in time by the given period of time. The second amount of electric energy of the machine C is an integrated value of electric power used by the machine C between the current point in time and the point in time being earlier than the current point in time by the given period of time. The second amount of electric energy of the machine D is an integrated value of electric power used by the machine D between the current point in time and the point in time being earlier than the current point in time by the given period of time.

Note that the monitoring section 21 calculates an absolute value of a difference between a measured value of the wattmeter 11 at the current point in time and a measured value of the wattmeter 11 at the point in time being earlier than the current point in time by the given period of time, and the monitoring section 21 monitors the absolute value as the second amount of electric energy of the machine A. The machines B to D are similar to the machine A in method for monitoring the second amount of electric energy (however, cases of the machines B, C, and D are different from that of the machine A in the following points. In the case of the machine B, the monitoring section 21 calculates the difference by use of a measured value of the wattmeter 12. In the case of the machine C, the monitoring section 21 calculates the difference by use of a measured value of the wattmeter 13. In the case of the machine D, the monitoring section 21 calculates the difference by use of a measured value of the wattmeter 14).

The power source control section 22 is a block for controlling the power sources of the machines A to D to be switched from on to off in accordance with the second amount of electric energy which amount is monitored by the monitoring section 21. A process performed by the power source control section 22 is described below.

While the production line 10 is in operation (in a state in which the power sources of the machines A to D are on and the machines A to D are normally operating), the power source control section 22 performs a threshold process on the second amounts of electric energy of the machines A to D with reference to a result of the monitoring by the monitoring section 21. Specifically, the power source control section 22 continues to determine whether or not the second amount of electric energy of the machine A decreases from a value being higher than a threshold value a to a value being not more than the threshold value a. The power source control section 22 continues to determine whether or not the second amount of electric energy of the machine B decreases from a value being higher than a threshold value b to a value being not more than the threshold value b. The power source control section 22 continues to determine whether or not the second amount of electric energy of the machine C decreases from a value being higher than a threshold value c to a value being not more than the threshold value c. The power source control section 22 continues to determine whether or not the second amount of electric energy of the machine D decreases from a value being higher than a threshold value d to a value being not more than the threshold value d.

Note here that the threshold values a to d (second threshold values) are values from which it is assumed that the machines A to D have completely stopped. Each of the threshold values can be empirically set in accordance with, for example, specs of each of the machines, contents of design of the line 10, and a kind of a workpiece. Note also that the threshold values a to d may be set by performing a test operation.

When the power source control section 22 detects that the second amount of electric energy of any of the machines of the machines A to D (first machine) decreases to the value being not more than the threshold value, the power source control section 22 controls the power sources of the machines (second machines) other than the machine whose second amount of electric energy is not more than the threshold value to be switched from on to off. For example, when the power source control section 22 detects that the second amount of electric energy of the machine A decreases from the value being higher than the threshold value a to the value being not more than the threshold value a, the power source control section 22 transmits, to the machines B to D, control signals for switching the power sources from on to off. This switches the power sources of the machines B to D from on to off.

Figure 4:
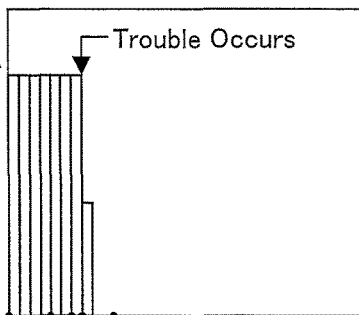
FIG. 4 is a graph showing (i) electric power used (electric power consumption) by each of machines A to D of Embodiment 2 and (ii) a change in electric power in a case where a trouble occurs in the machine A.
Figure 4:
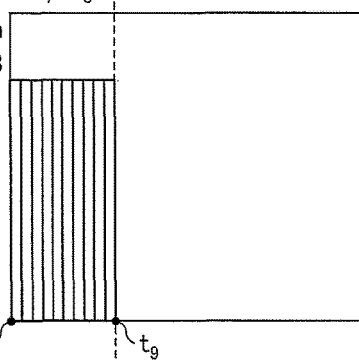
Figure 4:
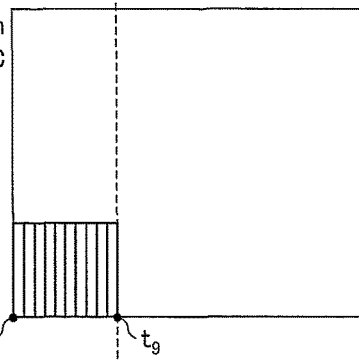
Figure 4:
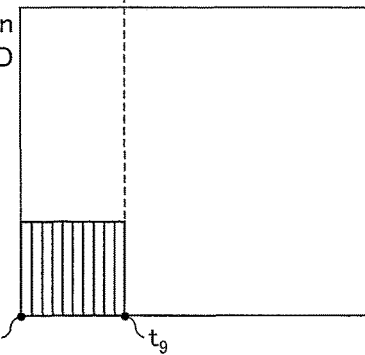

Next, timings at which the power sources are switched from on to off are described with reference to FIG. 4. FIG. 4 is a graph showing electric power used (electric power consumption) by each of the machines A to D of Embodiment 2. In each of graphs shown in FIG. 4, a horizontal axis shows time, and a vertical axis shows electric power consumption by each of the machines (an instantaneous value).

At a point in time $t_5$ shown in FIG. 4, the machines A to D are operating normally and performing their respective processes (steps) on a workpiece being carried. The power source control section 22 continues to perform the threshold process on the second amounts of electric energy of the machines A to D while the machines A to D belonging to the production line 10 are normally operating. That is, the power source control section 22 continues to determine whether or not the second amount of electric energy of the machine A decreases from the value being higher than the threshold value a to the value being not more than the threshold value a. Similarly, the power source control section 22 continues to determine whether or not the second amount of electric energy of each of the machines B to D decreases from the value being higher than the threshold value corresponding to each of the machines B to D to the value being not more than the threshold value.

For example, in a case where the current point in time shifts to $t_6$ shown in FIG. 4, and the point in time being earlier than $t_6$ by the given period of time is $t_5$, an integrated value of electric power consumption during a period between $t_6$ and $t_5$ corresponds to the second amount of electric energy. Accordingly, when the current point in time is $t_6$, the power source control section 22 continues to determine for the machine A whether or not an integrated value of electric power consumption during the period between the points in time $t_6$ and $t_5$ (the second amount of electric energy) is not more than the threshold value a. Similarly, the power source control section 22 continues to determine for each of the machines B to D whether or not an integrated value of electric power consumption during the period between the points in time $t_6$ and $t_5$ (the second amount of electric energy) is not more than the threshold value corresponding to each of the machines B to D.

Note that in each of the graphs shown in FIG. 4, an integrated value for the period between the points in time $t_6$ and $t_5$ corresponds to the integrated value of electric power consumption during the period between the points in time $t_6$ and $t_5$.

According to the example of FIG. 4, the integrated value of electric power consumption by each of the machines A to D (second amount of electric energy) is higher than the threshold value corresponding to each of the machines during the period between the point in time $t_6$ and the point in time $t_5$. Therefore, in a case where the current point in time is $t_6$, the power source control section 22 maintains the power sources of the machines A to D to be on.

Assume that a trouble occurs in the machine A at a point in time $t_8$ shown in FIG. 4. Assume also that during a period between the point in time $t_8$ and a point in time $t_9$, which is later than the point in time $t_8$, though the second amount of electric energy (integrated value of electric power consumption between the current point in time and the point in time being earlier than the current point in time by the given period of time) of the machine A is higher than the threshold value a, when the current point in time reaches $t_9$, the second amount of electric energy of the machine A is not more than the threshold value a due to the stop (described earlier). Note that the second amount of electric energy of the machine A in a case where the current point in time is the point in time $t_9$ is an integrated value of electric power consumption by the machine A between the current point in time $t_9$ and a point in time $t_7$, which is earlier than the current point in time $t_9$ by a given period of time.

The power source control section 22 determines, during a period until the current point in time reaches $t_9$, that the second amount of electric energy of the machine A is more than the threshold value a. Therefore, the power source control section 22 does not switch the power sources of the machines B to D during the period until the current point in time reaches $t_9$. However, when the current point in time reaches $t_9$, the power source control section 22 determines that the second amount of electric energy of the machine A is not more than the threshold value a. Therefore, the power source control section 22 switches the power sources of the machines B to D from on to off. This causes the machines B to D to simultaneously stop operating at the point in time $t_9$, so that no electric power is consumed after the point in time $t_9$.

As described above, the control device 20 of Embodiment 2 controls the power sources of the machines B to D to be switched from on to off when the second amount of electric energy of the machine A decreases from the value being higher than the threshold value a to the value being not more than the threshold value a. Note here that, in a case where a machine continues to operate normally, the second amount of electric energy of that machine (integrated value of electric power used between the current point in time and the point in time being earlier than the current point in time by the given period of time) shifts at a substantially constant value. However, if a trouble occurs in the machine, the second amount of electric energy decreases. Then, in a case where the second amount of electric energy decreases to a value being not more than a given value (any one of the threshold values a to d), it can be determined that the machine has completely stopped due to the trouble.

Therefore, according to Embodiment 2 in which the power sources of the machines B to D are controlled to be switched from on to off when the second amount of electric energy of the machine A decreases from the value being higher than the threshold value a to the value being not more than the threshold value a, the power sources of the machines B to D are immediately turned off when a situation occurs in which it can be recognized that the machine A has stopped due to the trouble.

Therefore, since the power sources of the machines B to D can be immediately turned off after the machine A has stopped due to the trouble, it is possible to yield an effect of preventing wasteful electric power consumption. This effect is specifically described below.

In a case where the machine A has stopped due to a sudden trouble, the workpiece is not outputted from the machine A. Therefore, if the machines B to D located downstream from the machine A in the direction in which the workpiece is carried maintain the power sources to be on, the machines B to D continue to be in an unnecessary standby state (a state in which electric power is being consumed while no process is being performed on the workpiece). Therefore, in a case where the machine A has stopped due to a trouble, unless the power sources of the machines B to D are immediately turned off, electric power is wastefully consumed due to an unnecessary standby state. In this regard, according to the configuration of Embodiment 2, it is possible to prevent wasteful electric power consumption due to the unnecessary standby state since the power sources of the machines B to D are immediately turned off when the situation occurs in which it can be recognized that the machine A has stopped due to the trouble.

Further, according to the example shown in FIG. 4, since a trouble has occurred in a machine located on the most upstream side (the machine A), a power source of a machine located downstream from the machine in which the trouble has occurred is turned off in accordance with the second amount of electric energy of the machine in which the trouble has occurred. Meanwhile, in a case where a trouble has occurred in a machine located downstream from a machine, a power source of a machine located upstream from the machine in which the trouble has occurred is turned off in accordance with the second amount of electric energy of the machine in which the trouble has occurred.

Figure 5:
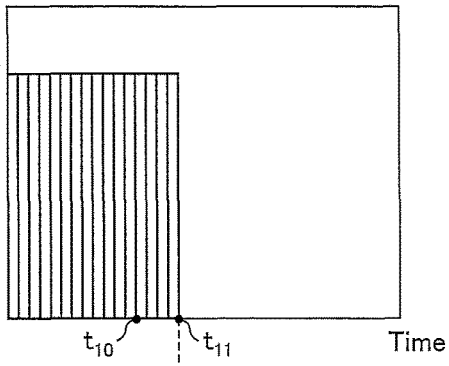
FIG. 5 is a graph showing (i) electric power used (electric power consumption) by each of the machines A to D of Embodiment 2 and (ii) a change in electric power in a case where a trouble occurs in the machine B.
Figure 5:
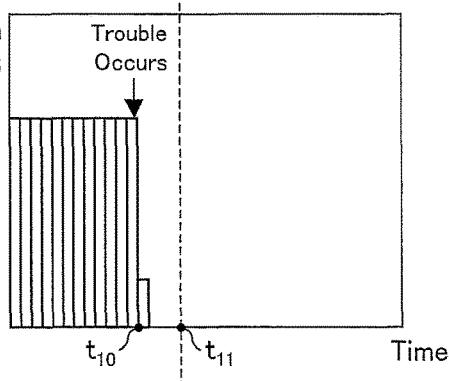
Figure 5:
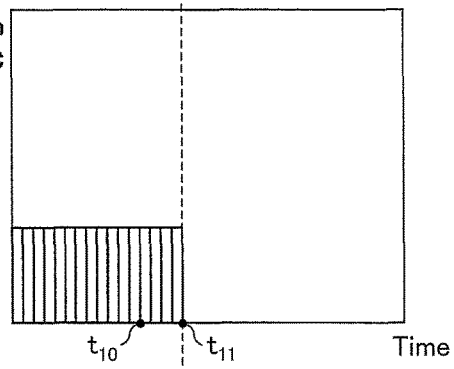
Figure 5:
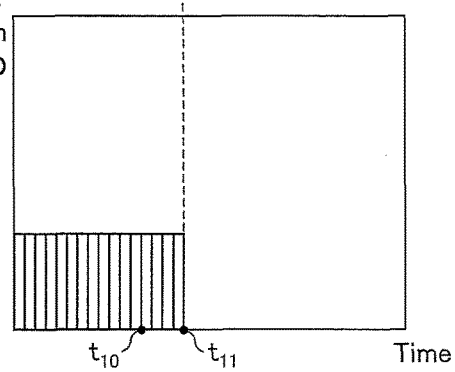

For example, at a point in time $t_{10}$, a trouble has occurred in the machine B while the machines A, C, and D are operating normally (see FIG. 5). According to the example shown in FIG. 5, though the second amount of electric energy of the machine B is higher than the threshold value b during a period until the current point in time reaches $t_{11}$, the second amount of electric energy of the machine B decreases to a value being not more than the threshold value b when the current point in time reaches $t_{11}$. Therefore, during the period until the current point in time reaches $t_{11}$, the power source control section 22 determines that the second amount of electric energy of the machine B is more than the threshold value b. Therefore, the power source control section 22 does not switch the power sources of the machines A, C, and D. However, when the current point in time reaches $t_{11}$, the power source control section 22 determines that the second amount of electric energy of the machine B is not more than the threshold value b. Therefore, the power source control section 22 switches, from on to off, the power source of the machine A located upstream from the machine B in the direction in which the workpiece is carried, and switches, from on to off, the power sources of the machines C and D located downstream from the machine B in the direction in which the workpiece is carried.

According to this, in a case where a machine has stopped due to a trouble, since a power source of a machine located upstream, in the direction in which the workpiece is carried, from the machine which has stopped due to the trouble can be immediately turned off, it is possible to yield an effect of preventing wasteful electric power consumption. This effect is specifically described below.

In a case where the machine B has stopped due to a sudden trouble, even if the machine A located upstream from the machine B in the direction in which the workpiece is carried continues to perform its process, the machine B cannot perform its process on the workpiece to be outputted from the machine A. Therefore, it is wasteful to cause the machine A to continue to perform the process. This brings about wasteful electric power consumption. In contrast, according to the configuration of Embodiment 2, it is possible to prevent wasteful electric power consumption since the power source of the machine A located upstream from the machine B is immediately turned off when the situation occurs in which it can be recognized that the machine B has stopped due to the trouble. Therefore, it is possible to prevent wasteful electric power consumption.

Note that the above description has discussed a configuration in which an integrated value of electric power used between the current point in time and a point in time being earlier than the current point in time by a given period of time (fourth period of time) is assumed as the second amount of electric energy. However, the present invention is not limited to such a configuration. For example, one or more embodiments of the present invention may be configured as below. Assume that an integrated value of electric power used between a point in time being earlier than the current point in time by a given period of time a (fifth period of time) and a point in time being earlier than the current point in time by a given period of time b (sixth period of time) that is shorter than the given period of time a is the second amount of electric energy. In this case, when the second amount of electric energy of a machine decreases from a value being higher than a threshold value to a value being not more than the threshold value, power sources of other machines are switched from on to off.

Further, the above description of Embodiment 2 assumes that the second amount of electric energy of a machine in which a trouble has occurred decreases to a value being not more than a threshold value. Meanwhile, for example, also in a case where the power source of any one of the machines A to D is manually turned off by a worker for some reason and the second amount of electric energy of that machine decreases to a value being not more than a threshold value, the power sources of the other machines may be configured to be turned off by the control device 20.

According to the threshold process of Embodiment 2, it is determined whether or not the second amount of electric energy (integrated value of electric power consumption between the current point in time and the point in time being earlier than the current point in time by the given period of time) of each of the machines A to D decreases to a value not more than a threshold value. However, the present invention is not limited to the above embodiments. For example, according to one or more embodiments of the present invention, a threshold process described below may be performed. First, for each of the machines A to D, an integrated value of an amount of electric energy for a case where each of the machines A to D normally operates during a period identical in length to a period during which the second amount of electric energy is to be calculated (period between the current point in time and the point in time being earlier than the current point in time by the given period of time) is calculated as a normal value in advance by performing a test operation on the line 10. Next, normal values of the machines A to D are stored in a memory (not illustrated) of the control device 20. For example, an integrated value of electric power consumption by the machine A between $t_5$ and $t_6$ shown in FIG. 4 can be a normal value of the machine A.

While the line 10 is normally operating, the power source control section 22 calculates, for each of the machines A to D, a difference value obtained by subtracting the second amount of electric energy from the normal value, and the power source control section 22 continues to determine whether or not the difference value thus calculated increases from a value being less than a threshold value to a value being not less than the threshold value. Further, when the power source control section 22 detects that the difference value of any one of the machines A to D increases to the value being not less than the threshold value, the power source control section 22 controls the power sources of the machines other than the machine in which the difference value increases to the value being not less than the threshold value to be switched from on to off. According to such a threshold process, in a case where there is a machine whose second amount of electric energy decreases to a value being extremely lower than the normal value, the power sources of the machines other than that machine are turned off. Note here that the decrease in second amount of electric energy of the machine to the value being extremely lower than the normal value makes it possible to consider that the machine has stopped due to, for example, a trouble. Therefore, also according to the above threshold process, it is possible to prevent wasteful electric power consumption since, when a situation occurs in which it can be recognized that a machine has stopped due to a trouble, power sources of other machines are immediately turned off.

Embodiment 3

One or more embodiments of the present invention may also be configured as below. An amount of electric energy of each of machines for a period which is set by an operator or a system designer in advance (hereinafter referred to as "a set period") is calculated as a third amount of electric energy, and a total value of third amounts of electric energy of the machines are displayed in a display device. This configuration is described below.

The control device 20 includes not only the monitoring section 21 and the power source control section 22 but also the calculation section 23 and the display control section 24 (see FIG. 2).

The monitoring section 21 of Embodiment 3 is a block for referring to a result of measurement by the wattmeters 11 to 14 so as to calculate, for each of the machines A to D, the third amount of electric energy which is an integrated value of electric power used during the set period. Note that the set period is a period which is set by an operator or a system designer in advance (described earlier). It is assumed here that the set period is a total period between a point in time at which the production line 10 is located in a factory and the current point in time.

The calculation section 23 is a block for calculating a total value of the third amount of electric energy of the machine A, the third amount of electric energy of the machine B, the third amount of electric energy of the machine C, and the third amount of electric energy of the machine D. The display control section 24 is a block for causing the display device 30 to display the total value calculated by the calculation section 23.

The configuration has an advantage such that an operator (a worker) can easily watch an amount of electric power consumed in the entire line.

Note that according to the configuration, the set period is not limited to the total period. For example, a period between a point in time at which operation of the production line 10 is started and the current point in time may be a set period. Alternatively, a day to which the current point in time belongs may be the set period, or a year to which the current point in time belongs may be the set period.

According to one or more of the embodiments described earlier, each of means for communication between the control device 20 and each of the wattmeters and means for communication between the control device 20 and each of the machines A to D may be a well-known wired system or a well-known wireless system. Note, however, a wireless system makes it unnecessary to perform complicated wiring while a system is being located.

The control device 20 may also be configured to transmit, to a portable terminal device carried by a worker, the total value calculated by the calculation section 23, and to cause a display device of the portable terminal device to display the total value.

Note that the above description of one or more of the embodiments has taken a production line as an example. However, the scope of application of the present invention is not limited to the production line. One or more embodiments of the present invention is also applicable to, for example, an inspection line and a package classification line in a distribution center.

Embodiments of the present invention may have one or more of the following advantages (1) through (9):

(1) Switching between on and off of a power source of each of the machines can be operated automatically and minutely at a suitable timing in accordance with how each of the machines of the production line 10 is operating, so that electric power consumption caused by a standby state or idle running can be minimized. In contrast, for example, according to a case where an amount of electric energy is displayed in a display device and a worker switches power sources of a large number of machines in accordance with the amount of electric energy thus displayed, switching between on and off of a power source cannot be operated minutely at a suitable timing. Further, it is difficult for a non-skilled worker to determine, in accordance with a change in amount of electric energy, a suitable timing at which a power source is switched. Therefore, according to a case where a worker switches a power source of each of the machines, it is difficult to minimize electric power consumption caused by a standby state or idle running.

(2) All the machines that operate in accordance with electric power include power sources having similar forms. Therefore, the configurations of Embodiments 1 to 3 are applicable to various kinds of lines.

(3) According to a conventional configuration in which power source control is performed in accordance with an output of a sensor for detecting a location of a workpiece, it is necessary to minutely monitor carrying in/out of a workpiece to/from each of machines. Therefore, it is necessary to severely select an optimum sensor and a location of the optimum sensor for each of devices. This complicates a design operation. In contrast, according to the configurations of Embodiments 1 to 3, no power source control is performed in accordance with an output of the sensor. Therefore, the configurations of Embodiments 1 to 3 need to less severely select a sensor and a location of the sensor than the conventional configuration, so that design operations of the configurations of Embodiments 1 to 3 are easier than that of the conventional configuration.

(4) According to the conventional configuration, in a case where many kinds of workpieces are processed in an identical line, it may be necessary to exchange sensors in accordance with a change in kind of a workpiece. In contrast, according to the configurations of Embodiments 1 to 3, in a case where many kinds of workpieces are processed in an identical line, even if a kind of a workpiece is changed, only a threshold value needs to be changed and it is unnecessary to exchange wattmeters.

(5) According to the conventional configuration, a period of a standby state or a period of idle running is secured than necessary. Therefore, wasteful electric power consumption increases in the case of minutely switching between operation and non-operation of a line so as to frequently finely adjust the line. In contrast, according to Embodiments 1 to 3, a period of a standby state or a period of idle running can be minimized as much as possible. Therefore, in a case where a line is frequently finely adjusted, the configurations of Embodiments 1 to 3 allow a further reduction in electric power consumption than the conventional configuration.

(6) According to the configurations of Embodiments 1 to 3, an output of a sensor for detecting a location of a workpiece is not used for power source control. Therefore, the configurations of Embodiments 1 to 3 allow a further reduction in (i) number of sensors to be provided and (ii) operation in which the sensors are wired than the conventional configuration, so that a reduction in cost can be achieved.

(7) According to the configuration of Embodiment 3, measured values of the wattmeters 11 to 14 can be used not only for the power source control of the production line 10 but also for preparation of data for watching electric power consumption (information which is displayed in the display device 30).

(8) According to the configuration of the modified example of Embodiment 1, it is possible to perform control such that a power source of a machine located on the upstream side is turned on in accordance with how idle running of a machine located on the downstream side is progressing. In contrast, according to the conventional configuration, it is impossible to determine, merely by detection of a workpiece, how idle running of a machine is progressing. Therefore, it is difficult for the conventional configuration to perform control such that a power source of a machine located on the upstream side is turned on in accordance with how idle running of a machine located on the downstream side is progressing.

(9) Further, according to the conventional configuration, in a case where a machine α and a machine β located downstream from the machine α are provided, a sensor is provided between the machine α and the machine β. The number of remaining workpieces which number is detected by a sensor exceeds a given value in a case where a trouble occurs in the machine β. If the number of the remaining workpieces exceeds the given value, control is performed such that a power source of the machine α is turned off. However, according to such a method, an additional sensor needs to be provided, and adjustment of a line requires a long time since for example, a kind of a sensor, an adjustment of a location in which the sensor is provided, and setting of a condition under which it is determined whether or not the workpieces remain are complicated. In contrast, according to the configuration of Embodiment 2 in which in accordance with the second amount of electric energy of a machine, power sources of other machines are turned off, an output of the sensor is not used for controlling the power sources.

Note that the production line 10 of each of Embodiments 1 to 3 has only one control device 20. However, the present invention is not limited to such a configuration. For example, according to one or more embodiments of the present invention, control devices 20a to 20d may be provided in the production line 10 such that: in accordance with an amount of electric energy of the machine A, the control device 20a controls power sources of other machines; in accordance with an amount of electric energy of the machine B, the control device 20b controls power sources of other machines; in accordance with an amount of electric energy of the machine C, the control device 20c controls power sources of other machines; and in accordance with an amount of electric energy of the machine D, the control device 20d controls power sources of other machines. In this case, the control device 20a monitors the amount of electric energy of the machine A in accordance with a measured value of the wattmeter 11, the control device 20b monitors the amount of electric energy of the machine B in accordance with a measured value of the wattmeter 12, the control device 20c monitors the amount of electric energy of the machine C in accordance with a measured value of the wattmeter 13, and the control device 20d monitors the amount of electric energy of the machine D in accordance with a measured value of the wattmeter 14. Further, in this case, the control device 20a may be a control integrated circuit which is provided in the machine A, the control device 20b may be a control integrated circuit which is provided in the machine B, the control device 20c may be a control integrated circuit which is provided in the machine C, and the control device 20d may be a control integrated circuit which is provided in the machine D.

Note that the threshold process is performed in one or more of the embodiments shown above. In case of a threshold process for determining whether or not a determination target value is not less than a threshold value, it may be determined whether or not "the determination target value≥the threshold value" or "the determination target value>the threshold value". Similarly, in case of a threshold process for determining whether or not a determination target value is not more than a threshold value, it may be determined whether or not "the determination target value ≤ the threshold value" or "the determination target value <the threshold value".

For example, according to Embodiment 1, the threshold process is performed in which it is determined whether or not the first amount of electric energy of the machine A is the value being not less than the threshold value A. According to this threshold process, it may be determined whether or not "the first amount of electric energy≥the threshold value A" or "the first amount of electric energy>the threshold value A". Further, for example, according to Embodiment 2, the threshold process is performed in which it is determined whether or not the second amount of electric energy of the machine A is the value being not more than the threshold value a. According to this threshold process, it may be determined whether or not "the second amount of electric energy≤the threshold value" or "the second amount of electric energy<the threshold value".

Note that a line herein refers to a system which performs processes such as fabricating, assembly, and inspection on a workpiece and the line of the present invention is not limited to a line such that a plurality of machines are provided in a straight line. For example, the line of one or more embodiments of the present invention may be a line such that an entire process is performed by a machine which is provided on the first floor of a building and a machine which is provided on the second floor of the building. Alternatively, the line of one or more embodiments of the present invention may be a line such that an entire process is performed by all a plurality of machines that are spread over a plurality of buildings.

The present invention is not limited to the description of the embodiments above, but may be altered by a skilled person within the scope of the claims. Embodiments based on a proper combination of technical means disclosed in different embodiments is encompassed in the technical scope of the present invention.

Each section of the control device 20 of each of the above embodiments can be achieved in a case where calculation means such as a CPU (Central Processing Unit) executes a program stored in storage means such as a ROM (Read Only Memory) or a RAM (Random Access Memory) and controls input means such as a keyboard, output means such as a display, or communication means such as an interface circuit. Therefore, merely in a case where a computer including these means executes the program by reading a recording medium in which the program is recorded, it is possible to perform various functions and various processes of a production line managing device of one or more embodiments of the present invention. Further, the various functions and the various processes can be performed by any computer by recording the program on a removable recording medium.

The recording medium may be a memory (not shown) for processing in a microcomputer. For example, the recording medium may be a program medium s Embodiment 2 such as a ROM per se. Alternatively, the recording medium may be a program medium that can read by inserting the recording medium into a program reading device provided as an external storage device (not shown).

In either case, the stored program according to one or more embodiments of the present invention is arranged to be executed by access by a microprocessor. Further, the program according to one or more embodiments of the present invention is arranged to be read and then downloaded to a program storage area of the microcomputer. It is assumed that the download program is stored in advance in the main apparatus.

Note that the program medium is a recording medium arranged to be separable from the main body. The recording medium may be, for example, a tape, such as a magnetic tape or a cassette tape; a magnetic disk, such as a flexible disk or a hard disk, or a disk, such as CD/MO/MD/DVD; a card, such as an IC card (memory card); or a semiconductor memory, such as a mask ROM/EPROM (erasable programmable read-only memory)/EEPROM (electrically erasable programmable read-only memory)/flash ROM. All these recording media hold a program in a fixed manner.

Alternatively, according to one or more embodiments of the present invention, a system configuration connectable to communication networks including the Internet causes a recording medium to carry a program in a flowing manner by downloading the program over a communication network.

Further, according to one or more embodiments of the present invention, when the program is downloaded from a communication network in this manner, the download program is stored in advance in the main apparatus or installed from another recording medium.

As described above, according to one or more embodiments of the present invention, a control device for controlling a line in which a plurality of machines performs processes in sequence on a workpiece, the control device includes: a monitoring section for monitoring an amount of electric energy of at least a first machine of the plurality of machines; and a power source control section for controlling a power source of at least a second machine of the plurality of machines in accordance with the amount of electric energy of the first machine. The configuration makes it possible to control the power source of the second machine in accordance with a process performed by the first machine (a process performed on the workpiece) or how idle running of the first machine is progressing. Therefore, for example, it is possible to minimize, as much as possible, a period of a standby state of the second machine or a period of the idle running of the first machine. This yields an effect of preventing wasteful electric power consumption.

The control device may also be configured such that the power source control section switches the power source of the second machine from off to on when the amount of electric energy of the first machine increases from a value being lower than a first threshold value to a value being not less than the first threshold value. The control device may also be configured such that the amount of electric energy is any of the following: (a) an integrated value of electric power used by the first machine between a point in time at which the power source of the first machine was turned on and a current point in time; (b) an integrated value of electric power used by the first machine between the current point in time and a point in time being earlier than the current point in time by a first period of time; and (c) an integrated value of electric power used by the first machine between a point in time being earlier than the current point in time by a second period of time and a point in time being earlier than the current point in time by a third period of time that is shorter than the second period of time.

The control device may also be configured such that the power source control section switches the power source of the second machine from on to off when the amount of electric energy of the first machine decreases from a value being higher than a second threshold value to a value being not more than the second threshold value. The control device may also be configured such that the amount of electric energy is any of the following: (a) an integrated value of electric power used by the first machine between the current point in time and a point in time being earlier than the current point in time by a fourth period of time; and (b) an integrated value of electric power used by the first machine between a point in time being earlier than the current point in time by a fifth period of time and a point in time being earlier than the current point in time by a sixth period of time that is shorter than the fifth period of time.

The control device may also be configured such that the monitoring section obtains the amount of electric energy by (i) dividing a target period during which the amount of electric energy is to be measured into a plurality of predetermined periods equal to each other, (ii) obtaining a period-integrated value of each of the predetermined periods by integrating, during the each of the predetermined periods, electric power consumed by the first machine, (iii) integrating only period-integrated values of the predetermined periods in the target period each of which period-integrated values is not less than a predetermined value, and (iv) regarding, as the amount of electric energy, a result obtained by integrating only the period-integrated values each being not less than the predetermined value.

The control device may also be configured such that the monitoring section monitors amounts of electric energy of all of the plurality of machines, the control device further including: a calculation section for calculating a total value of the amounts of electric energy of all of the plurality of machines; and a display control section for causing a display device to display the total value calculated by the calculation section.

According to one or more embodiments of the present invention, a control method for controlling a line in which a plurality of machines performs processes in sequence on a workpiece, the control method includes the steps of: (i) monitoring an amount of electric energy of at least a first machine of the plurality of machines; and (ii) controlling a power source of at least a second machine of the plurality of machines in accordance with the amount of electric energy of the first machine. The configuration yields an effect substantially identical to the effect mentioned above.

The control device may be realized by a computer. In this case, (i) a program for causing a computer to function as each section of the control device, and (ii) a computer-readable recording medium containing the program are also encompassed in the scope of the present invention.

One or more embodiments of the present invention is usable for a line including a plurality of machines. Examples of the line include a production line, an inspection line, and a classification line.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

10 Production line
11-14 Wattmeter
20 Control device
21 Monitoring section
22 Power source control section
23 Calculation section
24 Display control section
30 Display device
40 Input device
100 Metal-fabricating press
A-D Machine

The invention claimed is:

1. A control device for controlling a line in which a plurality of machines performs processes in sequence on a workpiece, the control device comprising:
   a monitoring section that monitors an integrated value of electric power used by a first machine of the plurality of machines having power sources, respectively, wherein the integrated value is obtained by integrating, by time, electric power used by the first machine in a given period; and
   a power source control section that controls ON/OFF of a corresponding power source of a second machine of the plurality of machines based on the integrated value of electric power used by the first machine,
   wherein the power sources of the plurality of machines are each independently controlled, and
   wherein the power source control section controls only ON/OFF of the power sources of the plurality of machines.

2. The control device as set forth in claim 1, wherein the power source control section switches the power source of the second machine from off to on when the integrated value of electric power used by the first machine increases from a value that is lower than a first threshold value to a value that is not less than the first threshold value.

3. The control device as set forth in claim 2,
   wherein the integrated value of electric power is an integrated value of electric power used by the first machine from the current point in time to a point in time that is earlier than the current point in time by a first period of time.

4. The control device as set forth in claim 2,
   wherein the integrated value of electric power is an integrated value of electric power used by the first machine from a point in time at which the power source of the first machine was turned on to a current point in time.

5. The control device as set forth in claim 1, wherein the power source control section switches the power source of the second machine from on to off when the integrated value of electric power used by the first machine decreases from a value that is higher than a second threshold value to a value that is not more than the second threshold value.

6. The control device as set forth in claim 5,
   wherein the integrated value of electric power is one of:
   (a) an integrated value of electric power used by the first machine from the current point in time to a point in time that is earlier than the current point in time by a period of time A; and
   (b) an integrated value of electric power used by the first machine from a point in time that is earlier than the current point in time by a period of time B to a point in time that is earlier than the current point in time by a period of time C that is shorter than the fifth period of time.

7. The control device as set forth in claim 1, wherein the monitoring section obtains the integrated value of electric power by:
   (i) dividing a target period during which the integrated value of electric power is to be measured into a plurality of predetermined periods equal to each other,
   (ii) obtaining a period-integrated value of each of the predetermined periods by integrating, during the each of the predetermined periods, electric power consumed by the first machine,
   (iii) integrating only period-integrated values of the predetermined periods in the target period each of which period-integrated values is not less than a predetermined value, and
   (iv) regarding, as the integrated value of electric power, a result obtained by integrating only the period-integrated values each of which is not less than the predetermined value.

8. The control device as set forth in claim 1, wherein the monitoring section monitors integrated values of electric power used by all of the plurality of machines, and
wherein the control device further comprises:
   a calculation section for calculating a total value of the integrated values of electric power used by all of the plurality of machines; and
   a display control section for causing a display device to display the total value calculated by the calculation section.

9. A non-transitory computer-readable recording medium containing a program that causes a computer to function as each section of a control device as set forth in claim 1.

10. A control method for controlling a line in which a plurality of machines performs processes in sequence on a workpiece, the control method comprising:
   (i) monitoring an integrated value of electric power used by at least a first machine of the plurality of machines having power sources, respectively, wherein the integrated value is obtained by integrating, by time, electric power used by the first machine in a given period; and
   (ii) controlling ON/OFF of a corresponding power source of a second machine of the plurality of machines based on the integrated value of electric power used by the first machine,
   wherein the power sources of the plurality of machines are each independently controlled, and
   wherein only ON/OFF of the power sources of the plurality of machines is controlled.

11. A control device for controlling a line in which a plurality of machines performs processes in sequence on a workpiece, the control device comprising:
   a monitoring means for monitoring an integrated value of electric power used by at least a first machine of the plurality of machines having power sources, respectively, wherein the integrated value is obtained by integrating, by time, electric power used by the first machine in a given period; and
   a power source control means for controlling ON/OFF of a corresponding power source of a second machine of the plurality of machines based on the integrated value of electric power used by the first machine,
   wherein the power sources of the plurality of machines are each independently controlled, and
   wherein the power source control means controls only ON/OFF of the power sources of the plurality of machines.

12. A control device for controlling a line in which a plurality of machines performs processes in sequence on a workpiece, the control device comprising:
   a monitoring section that monitors an integrated value of electric power used by a first machine of the plurality of machines, wherein the integrated value is obtained by integrating, by time, electric power used by the first machine in a given period; and
   a power source control section that controls a power source of at least a second machine of the plurality of machines based on the integrated value of electric power used by the first machine,
   wherein the power source control section switches the power source of the second machine from off to on when the integrated value of electric power used by the first machine increases from a value that is lower than a first threshold value to a value that is not less than the first threshold value, and
   wherein the integrated value of electric power is an integrated value of electric power used by the first machine from a point in time that is earlier than the current point in time by a second period of time to a point in time that is earlier than the current point in time by a third period of time that is shorter than the second period of time.

* * * * *